Patented May 13, 1930

1,758,651

UNITED STATES PATENT OFFICE

JOHN R. CONOVER, OF UPPER DARBY, PENNSYLVANIA, ASSIGNOR TO THE LABORATORY OF RESEARCH CHEMOTHERAPY, OF PHILADELPHIA, PENNSYLVANIA

CHEMICAL EMULSION

No Drawing.     Application filed May 29, 1924. Serial No. 716,569.

An object is to provide in such a chemical emulsion a new combination of elements in substantially definite proportions, such that the resulting compound is more compatible with the substance and structure of living animal tissue, and as a result of which fact a larger quantity of the emulsion is absorbed and actually coalesces with such tissue, towards the end of renewing or resuscitating the latter when partially destroyed, injured, or in an otherwise abnormal condition.

Heretofore, antiseptics, germicides, and chemotherapeutic agents have been applied to the living human body in four ways, viz., (1) alone, (2) in aqueous or alcoholic solutions, (3) in oily solutions or ointments, and (4) occasionally incorporated in solid or semi-solid emulsions of the water-in-oil type. However, since living tissue is a complex chemical emulsion with water as the external phase, that is, in but physical combination with the other elements comprising the tissue, it is quite obvious that none of these forms or solutions of antiseptics, germicides, or chemotherapeutic agents is thoroughly compatible with the substance of the tissue, and that because of their very nature they are prevented from exerting the maximum degree of the effect desired, in fact only very small portions of them are taken up or absorbed by the tissue.

In producing the present improved emulsion, substances have been used which are identical with those found in animal tissue or tissue-producing material, as for instance the natural skin secretion of sheep, known as lanolin (or other unguents or unguentous substance such as fats, waxes or lipoids from other animal sources,) and the natural protein of milk, known as casein, or other proteins of animal origin such as egg albumen and serum albumen, with which the lanolin as an example is emulsified. The emulsion thus produced serves as a most efficient carrier for other substances, as the former coalesces directly with and is in relatively large quantities absorbed by the tissue of the skin, muscles and mucous membranes, and thereby conveys into intimate impregnation of such tissue certain carefully chosen antiseptic germicidal, and chemotherapeutic agents having known values. For instance, this emulsion combined with such agents as a colloidal silver salt, phenol, etc., is of value in correcting tissue metabolism, in pathologic conditions, and in controlling and eliminating infections.

The present improved emulsion, while it is not actually a bio-chemical emulsion in the fact that it cannot be considered as actual living tissue, is nevertheless a close approximation to live tissue. And it is this fact among others that makes the present improved emulsion so effective.

The chemical emulsion is prepared thus:— One thousand (1,000) parts of casein are dissolved in sixty-five hundred (6500) parts of water with the aid of a mixture of alkalies and alkaline earths as $50 \times 10^{-5}$ equivalents each of mixed alkalies such as sodium, potassium and calcium hydroxides. The resulting solution is stirred and heated on a water bath until homogeneous. Any one, or any combination, of the above alkalies may be used and the quantities varied in order to regulate the consistency of the finished product, also the carbonates of the three metals, and in fact the bicarbonates of the same may be substituted with good results. However, to this calcium-sodium-potassium-caseinate solution is now added fifteen hundred (1500) parts of hydrated lanolin, or an equivalent quantity of anhydrous lanolin, and the stirring continued until complete emulsification has taken place.

The colloidal potassium silver salt of polypeptides derived from casein is prepared thus:—Four hundred (400) parts of casein are dissolved in water containing $540 \times 10^{-5}$ equivalents of either sodium or potassium (but not calcium) hydroxide, and heated at the temperature of the water bath for about one hour. The resulting solution of alkaline products of casein, is cooled and mixed with a solution of one hundred sixty (160) parts of silver nitrate dissolved in one thousand (1000) parts of water and the whole stirred and heated to a temperature not to exceed 90° C. for preferably not longer than one hour.

The chemical emulsion of silver is prepared thus:—The chemical emulsion, obtained as before described, is heated and stirred, while the colloidal potassium silver salt solution, obtained also as before described, is slowly added. The combined emulsion and silver solution is then stirred until homogeneous and allowed to cool.

In conclusion, the above product when prepared substantially as described possesses a germicidal value equal to or greater than that of a 1.33% phenol solution, but as before stated impregnates and coalesces with living tissue to a far greater degree than phenol and other solutions and emulsions, and unlike the usual colloidal silver preparations retains its characteristic activity indefinitely.

Definitions:—In the claims hereto appended, "casein" is employed as a generic term to represent a group or class, which in addition to casein includes other suitable proteins such as egg and serum albumen. Likewise, "lanolin" unguent or unguentous mass are in places employed generically to represent breviately not only lanolin, but fats, waxes and lipoids from other animal sources than sheep, this group while being equivalents for the purposes of the present processes and products are not chemically the same or related, wherefore there is no name for the members of the group as a class. Furthermore, in referring in the specification and claims to the "water bath for substantially one hour", there is in mind the result obtained by subjecting the casein for about one hour or more to the temperature at which water boils under atmospheric pressure at sea level, regardless of how else this result may be obtained, and determined only by the breaking down of the casein.

Having thus described my invention, what I claim and desire to protect by Letters Patent of the United States is:—

1. The process of producing an unguent-silver-caseinate emulsion which consists in producing an alkali-caseinate emulsion by dissolving casein in an alkaline solution, adding an unguentous substance thereto and stirring the mass to complete emulsification; in producing a colloidal potassium silver salt of the alkali degradation products of casein which consists in breaking down casein in a potassium solution and mixing the resulting solution with silver nitrate dissolved in water and then heating the alkali-caseinate solution and adding the collodial potassium silver salt solution to the heated alkali-caseinate and stirring the entire mass until homogeneous.

2. The process of producing an unguent-silver-caseinate emulsion which consists in producing an alkali-caseinate emulsion by dissolving casein in a mixture of alkalies and an alkaline earth, adding an unguentous substance thereto and stirring the mass to complete emulsification; in producing a colloidal potassium silver salt of the alkali degradation products of casein which consists in breaking down casein in a potassium solution by heating the same at the temperature of the water bath for substantially one hour, then cooling the same and mixing the resulting solution with silver nitrate dissolved in water, then heating the mass to a maximum temperature of 90 degrees C. for a maximum period of substantially one hour, heating the alkali caseinate solution and adding the collodial potassium silver salt solution to the heated alkali-caseinate and stirring the entire mass until homogeneous.

3. The process of producing an unguent-silver-caseinate emulsion which consists in producing an alkali-caseinate emulsion by dissolving casein in a mixture of potassium, sodium and calcium hydroxides adding an unguentous substance thereto and stirring the mass to complete emulsification; in producing a colloidal potassium silver salt of the alkali degradation products of casein which consists in breaking down casein in a potassium solution by heating the same at the temperature of the water bath for substantially one hour, then cooling the same and mixing the resulting solution with silver nitrate dissolved in water, then heating the mass to a maximum temperature of 90 degrees C. for a maximum period of substantially one hour, heating the alkali caseinate solution and adding the colloidal potassium silver salt solution to the heated alkali-caseinate and stirring the entire mass until homogeneous.

4. In a body of unguentous material serving as a vehicle an emulsion comprising an alkali-caseinate and a colloidal potassium silver salt of the alkaline degradation products of casein.

5. In a body of unguentous material serving as a vehicle an emulsion comprising an alkali and an alkaline earth caseinate and a colloidal potassium silver salt of the alkaline degradation products of casein.

6. In a body of 1500 parts of unguentous material serving as a vehicle an emulsion comprising 1000 parts of casein dissolved in 6500 c. c. of water containing $50 \times 10^{-5}$ equivalents of alkali hydroxides or carbonates and 400 parts of casein dissolved in water containing $540 \times 10^{-5}$ equivalents of alkali hydroxide and 160 parts of silver-nitrate dissolved in 1000 c. c. of water.

7. In a body of 1500 parts of unguentous material serving as a vehicle an emulsion comprising 1000 parts of casein dissolved in 6500 c. c. of water containing $50 \times 10^{-5}$ equivalents of the hydroxides, carbonates or bicarbonates of sodium, potassium and calcium and 400 parts of casein dissolved in water containing $540 \times 10^{-5}$ equivalents of alkali hydroxide and 160 parts of silver nitrate dissolved in 1000 c. c. of water.

8. The process of producing a lanolin-silver-caseinate emulsion which consists in producing an alkali-caseinate emulsion by dissolving casein in an alkali solution, adding lanolin thereto and stirring the mass to complete emulsification; in producing a colloidal potassium silver salt of casein which consists in breaking down casein in alkaline solution and mixing the resulting solution with silver nitrate dissolved in water; and then heating the alkali-caseinate emulsion, adding the colloidal potassium silver salt to the heated alkali-caseinate and stirring the mass to complete emulsification.

9. In a body of 1500 parts of lanolin an emulsion comprising 1000 parts of casein dissolved in 6500 c. c. of water, containing $50 \times 10^{-5}$ equivalents of alkali hydroxides or carbonates, and 400 parts of casein, dissolved in water containing $540 \times 10^{-5}$ equivalents of alkali hydroxide, and 160 parts of silver nitrate dissolved in 1000 c. c. of water.

10. In a body of lanolin an emulsion comprising an alkali-caseinate and a colloidal potassium silver salt of the alkaline degradation products of casein.

In testimony whereof I have affixed my signature.

JOHN R. CONOVER.